(12) United States Patent
Toriya

(10) Patent No.: US 11,175,399 B2
(45) Date of Patent: Nov. 16, 2021

(54) INFORMATION PROCESSING DEVICE, INFORMATION PROCESSING METHOD, AND STORAGE MEDIUM

(71) Applicant: NEC Corporation, Tokyo (JP)

(72) Inventor: Hisatoshi Toriya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 436 days.

(21) Appl. No.: 16/332,455

(22) PCT Filed: Sep. 13, 2017

(86) PCT No.: PCT/JP2017/032973
§ 371 (c)(1),
(2) Date: Mar. 12, 2019

(87) PCT Pub. No.: WO2018/056129
PCT Pub. Date: Mar. 29, 2018

(65) Prior Publication Data
US 2021/0302567 A1    Sep. 30, 2021

(30) Foreign Application Priority Data

Sep. 20, 2016  (JP) .............................. JP2016-183325

(51) Int. Cl.
*G01S 13/90*    (2006.01)
*G01S 7/295*    (2006.01)
*G01S 13/06*    (2006.01)

(52) U.S. Cl.
CPC ........ *G01S 13/9027* (2019.05); *G01S 7/2955* (2013.01); *G01S 13/06* (2013.01)

(58) Field of Classification Search
CPC ............ G01S 13/9021; G01S 13/9027; G06K 9/0063; G06K 9/3233; G06K 2009/6213;
(Continued)

(56) References Cited

U.S. PATENT DOCUMENTS 6,072,903 A * 6/2000 Maki ..................... G06T 7/246
                                                              348/169
10,338,215 B2 * 7/2019 Murata ................... G01S 7/411
(Continued)

FOREIGN PATENT DOCUMENTS

JP        09033649 A       2/1997
JP     2002267749 A       9/2002
(Continued)

OTHER PUBLICATIONS

Japanese Office Action for JP Application No. 2018-540992 dated Feb. 2, 2021 with English Translation.
(Continued)

*Primary Examiner* — Timothy X Pham
(74) *Attorney, Agent, or Firm* — Sughrue Mion, PLLC

(57) ABSTRACT

An information processing device according to one aspect of the present invention includes at least one memory storing instructions; and at least one processor coupled to the memory and configured to execute the instructions to: extract a candidate point which is a point contributing to a signal at a target point, based on a position of the target point in a three-dimensional space and a shape of an observed object, the target point being a point specified in an intensity map of the signal from the observed object, the intensity map being acquired by a radar; and generate an image indicating a position of the candidate point in a spatial image capturing the observed object.

20 Claims, 12 Drawing Sheets

(58) Field of Classification Search
CPC .. G06T 2207/10044; G06T 5/002; G06T 5/20
See application file for complete search history.

(56) References Cited

U.S. PATENT DOCUMENTS

| | | | |
|---|---|---|---|
| 2002/0101438 A1* | 8/2002 | Ham | G06T 7/97 345/629 |
| 2012/0274505 A1 | 11/2012 | Pritt et al. | |
| 2015/0323665 A1* | 11/2015 | Murata | G01S 7/411 342/25 A |
| 2016/0259046 A1 | 9/2016 | Bom et al. | |

FOREIGN PATENT DOCUMENTS

| | | | |
|---|---|---|---|
| JP | 2004-333445 | * | 11/2004 |
| JP | 2004333445 A | | 11/2004 |
| JP | 2007248216 A | | 9/2007 |
| JP | 2008090808 A | | 4/2008 |
| JP | 2008185375 A | | 8/2008 |
| JP | 2005-079296 | * | 4/2015 |
| JP | 2015079296 A | | 4/2015 |
| JP | 2015079296 A | * | 10/2015 |
| JP | 2016090361 A1 | | 5/2016 |
| WO | 2015/151134 A1 | | 10/2015 |
| WO | 2016125206 A1 | | 8/2016 |

OTHER PUBLICATIONS

International Search Report dated Dec. 12, 2017 from the International Bureau in counterpart International application No. PCT/JP2017/032973.

Ferretti, A., "Permanent Scatterers in SAR Interferometry", IEEE Transactions on Geoscience and Remote Sensing, vol. 39, No. 1, 2001, pp. 8-20 (13 pages).

* cited by examiner

Fig. 2
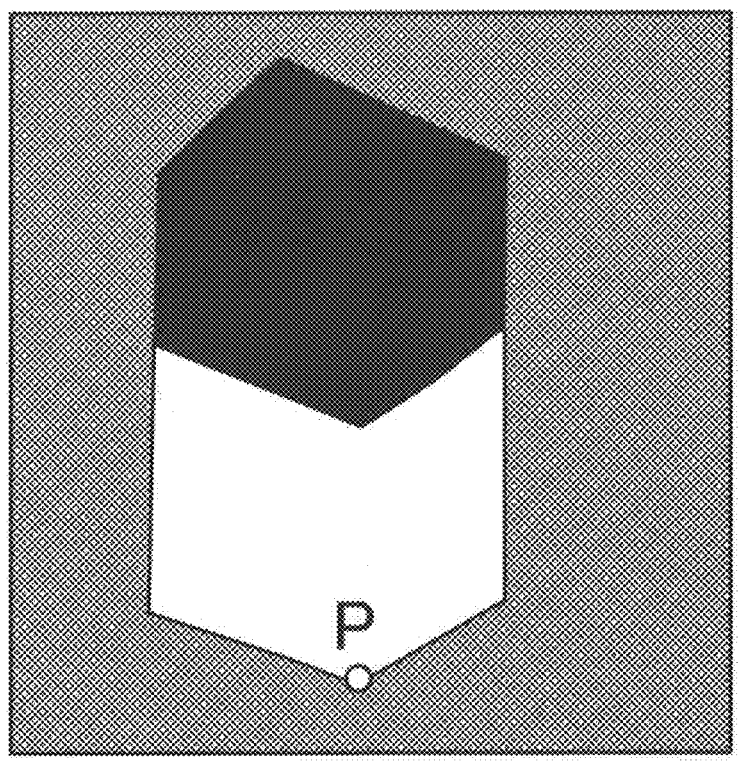
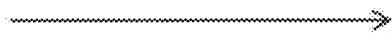

INFORMATION PROCESSING DEVICE, INFORMATION PROCESSING METHOD, AND STORAGE MEDIUM

This application is a National Stage Entry of PCT/JP2017/032973 filed on Sep. 13, 2017, which claims priority from Japanese Patent Application 2016-183325 filed on Sep. 20, 2016, the contents of all of which are incorporated herein by reference, in their entirety.

TECHNICAL FIELD

The present disclosure relates to processing of data acquired by a radar.

BACKGROUND ART

A technology of observing and analyzing an area to be observed from the sky for the purpose of observing a state of a ground surface and the like has become widespread.

Synthetic aperture radar (SAR) is a technology of observing a state of a ground surface by projecting an electromagnetic wave from the sky and acquiring an intensity of a reflected electromagnetic wave (hereinafter also expressed as a "reflected wave"). The SAR enables generation of a two-dimensional map (hereinafter referred to as a "SAR image") of an intensity of the reflected wave based on a distance between an antenna in the sky and an object reflecting the electromagnetic wave. In generation of a SAR image, a position closest to the radar side out of points on a reference plane (for example, a ground surface) is determined to be a position of an object reflecting an electromagnetic wave. Accordingly, reflection at a point distant from the reference plane (that is, reflection at a position at a certain altitude) is recognized as reflection from a position which is different from the actual position and is deviated toward the radar side. Consequently, the image becomes an image distorted compared with an actual appearance. Occurrence of the distorted image is called foreshortening.

PTLs 1 and 2 disclose a device performing correction processing called orthorectification in order to correct foreshortening.

PTL 3 discloses a technology of correction for a phenomenon called a "layover" which may be caused by distortion of an image. A "layover" refers to a phenomenon that, when reflection at a point positioned at a certain altitude is recognized as reflection from a position different from a true position, a reflected signal from the point and a reflected signal from the different position overlap one another.

CITATION LIST

Patent Literature

PTL 1: Japanese Unexamined Patent Application Publication No. 2007-248216
PTL 2: Japanese Unexamined Patent Application Publication No. 2008-90808
PTL 3: Japanese Unexamined Patent Application Publication No. 2008-185375

SUMMARY OF INVENTION

Technical Problem

Orthorectification as disclosed in PTLs 1 and 2 does not assume performing correction of a SAR image in which a layover occurs. Specifically, orthorectification is correction by which a position of a point where distortion occurs is shifted to a position estimated to be a true position. In other words, the orthorectification as described in PTL 1 is processing performed on an assumption that there is one candidate of a true point contributing to an intensity at a correction target point.

When a correction target point exists in a region where a layover occurs, a plurality of candidates of a true point contributing to an intensity at the correction target point may exist. Accordingly, the orthorectification as disclosed in PTLs 1 and 2 does not correct a point in a region where a layover occurs. PTL 3 discloses a method of correcting a layover by use of a plurality of SAR images. However, the correction requires a plurality of differently distorted SAR images.

Thus, without some supplementary information, it is theoretically impossible to isolate reflection positions, which are positions having reflected the electromagnetic wave of a radar, contributing to a signal lying on a point in a region where a layover occurs in a single SAR image.

When a layover is not corrected, that is, when a candidate of a reflection point contributing to a signal at a certain point is not narrowed down, it is a common practice that a person estimates a candidate of a reflection point contributing to the signal on the basis of experience and various pieces of information while viewing a SAR image.

An object of the present invention is to provide a device, a method, and a program that facilitate understanding of a point contributing to a signal at a point in a region where a layover occurs in a SAR image. In addition to a SAR image, images used in the present invention may include an image acquired by some other technique for estimating a state of a target object by observing reflection of an electromagnetic wave, such as an image based on real aperture radar (RAR).

Solution to Problem

An information processing device according to one aspect of the present invention includes: candidate point extraction means for extracting a candidate point which is a point contributing to a signal at a target point, based on a position of the target point in a three-dimensional space and a shape of an observed object, the target point being a point specified in an intensity map of the signal from the observed object, the intensity map being acquired by a radar; and image generation means for generating an image indicating a position of the candidate point in a spatial image capturing the observed object.

An information processing method according to one aspect of the present invention includes: extracting a candidate point which is a point contributing to a signal at a target point, based on a position of the target point in a three-dimensional space and a shape of an observed object, the target point being a point specified in an intensity map of the signal from the observed object, the intensity map being acquired by a radar; and generating an image indicating a position of the candidate point in a spatial image capturing the observed object.

A program according to one aspect of the present invention causes a computer to perform: candidate point extraction processing of extracting a candidate point which is a point contributing to a signal at a target point, based on a position of the target point in a three-dimensional space and a shape of an observed object, the target point being a point specified in an intensity map of the signal from the observed object, the intensity map being acquired by a radar; and image generation processing of generating an image indicating a position of the candidate point in a spatial image capturing the observed object.

Advantageous Effects of Invention

The present invention facilitates understanding of a point, on an observed object, which contributes to a signal at a point in a region where a layover occurs in an intensity map of signals that have been acquired with a radar from the observed object.

BRIEF DESCRIPTION OF DRAWINGS

FIG. 2 illustrates an example of a SAR image.

EXAMPLE EMBODIMENT

Prior to description of example embodiments of the present invention, a principle of occurrence of foreshortening in an observation by SAR will be described.

Figure 1:
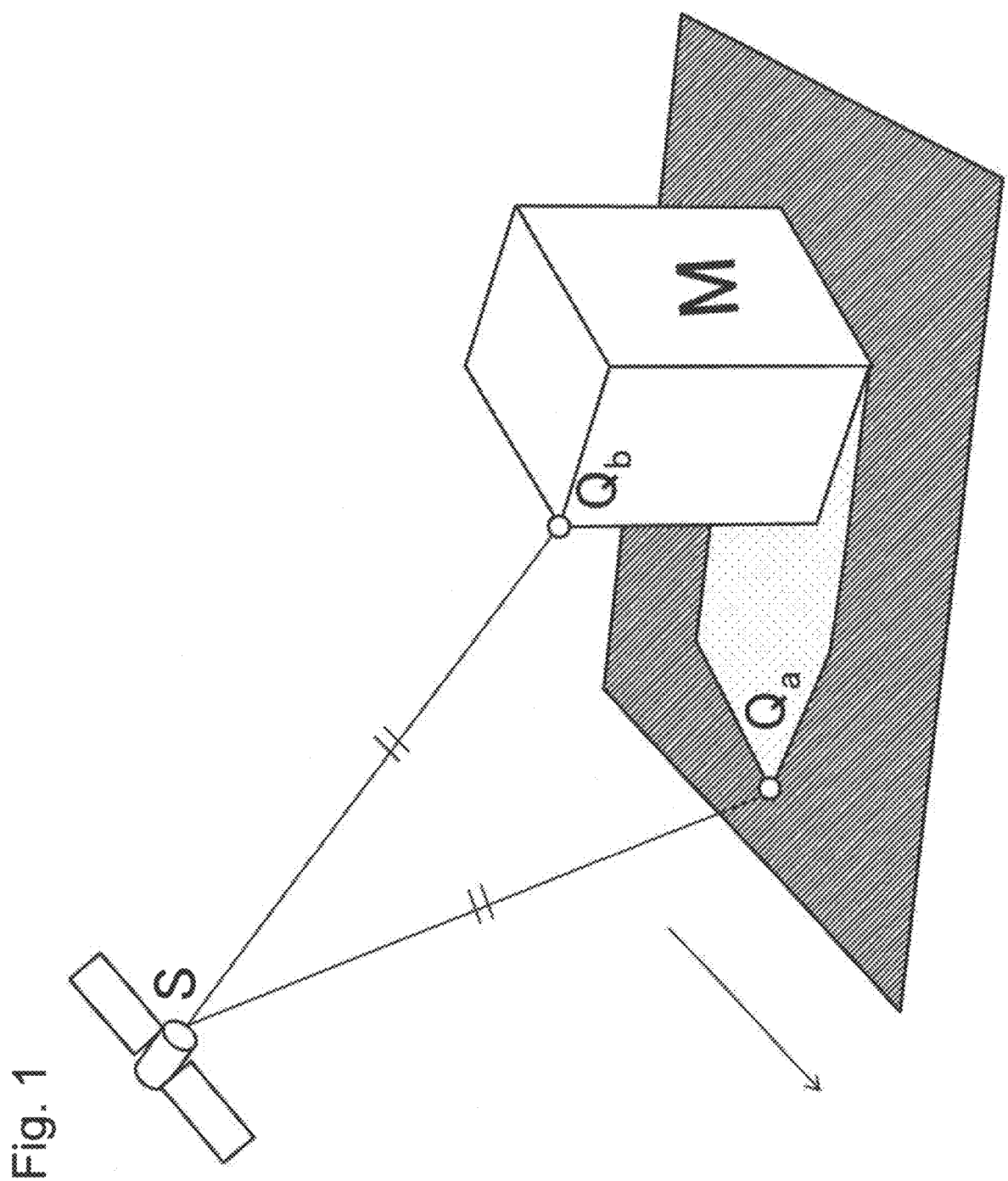
FIG. 1 is a diagram illustrating a positional relation between a satellite making an observation by SAR and a target object.

FIG. 1 is a diagram illustrating a positional relation between observation equipment performing an observation by SAR and a target object. For example, SAR is provided by a flying object—such as an artificial satellite or an aircraft—equipped with a radar. A flying object equipped with a radar providing SAR moves in the sky, for example, while maintaining an altitude. An arrow in FIG. 1 indicates a traveling direction of the flying object equipped with the radar, that is, a traveling direction (also referred to as an azimuth direction) of the radar. An electromagnetic wave transmitted from a point S in FIG. 1 reflects at a ground surface and a structure M on the ground surface; and part of the reflected wave returns to the radar and is detected.

In FIG. 1, a point $Q_a$ is a point on the ground surface, and a point $Q_b$ is a point positioned at a certain altitude on a surface of the structure M. A distance between the point S and the point $Q_a$ is equal to a distance between the point S and the point $Q_b$. Further, a line connecting the point $Q_b$ and the point $Q_a$ is perpendicular to the traveling direction of the radar. In such a case, a reflected wave at the point $Q_a$ is not distinguished from a reflected wave at the point $Q_b$ by the radar. Specifically, an intensity of the reflected wave from the point $Q_a$ and an intensity of the reflected wave from the point $Q_b$ are observed in an intermixed manner.

FIG. 2 illustrates an example of an image (hereinafter referred to as a "SAR image") indicating an intensity distribution of a reflected wave generated in such a case. In FIG. 2, an arrow indicates a traveling direction of a radar. A SAR image is generated on the basis of an intensity of a reflected wave reaching the radar, and a distance between a point from which the reflected wave is transmitted and the radar. While positions in the traveling direction of the radar can be specified, reflected waves from two points with an equivalent distance from the radar are not distinguished when the two points are equally positioned with respect to the traveling direction of the radar. Accordingly, while a point P is a point reflecting an intensity of the reflected wave from the point $Q_a$, an intensity indicated by the point P also reflects an intensity of the reflected wave from the point $Q_b$. This phenomenon is referred to as a layover. In FIG. 2, a white region including the point P represents a region where a layover occurs. A solidly shaded region in FIG. 2 represents a region shadowed against the radar by the structure M. This region is also called a radar shadow.

Referring to drawings, example embodiments of the present invention is described in detail below.

First Example Embodiment

First, a first example embodiment of the present invention is described.

Configuration

In the following description, a three-dimensional space serving as a reference in processing handling positional information is defined in an information processing device 11. A three-dimensional coordinate system is defined for the three-dimensional space serving as the reference. The three-dimensional coordinate system is hereinafter referred to as a "reference three-dimensional coordinate system" or a "reference coordinate system". As described later, the reference coordinate system may be a geodetic system or a coordinate system of model data 1113 which are three-dimensional data.

Figure 3:
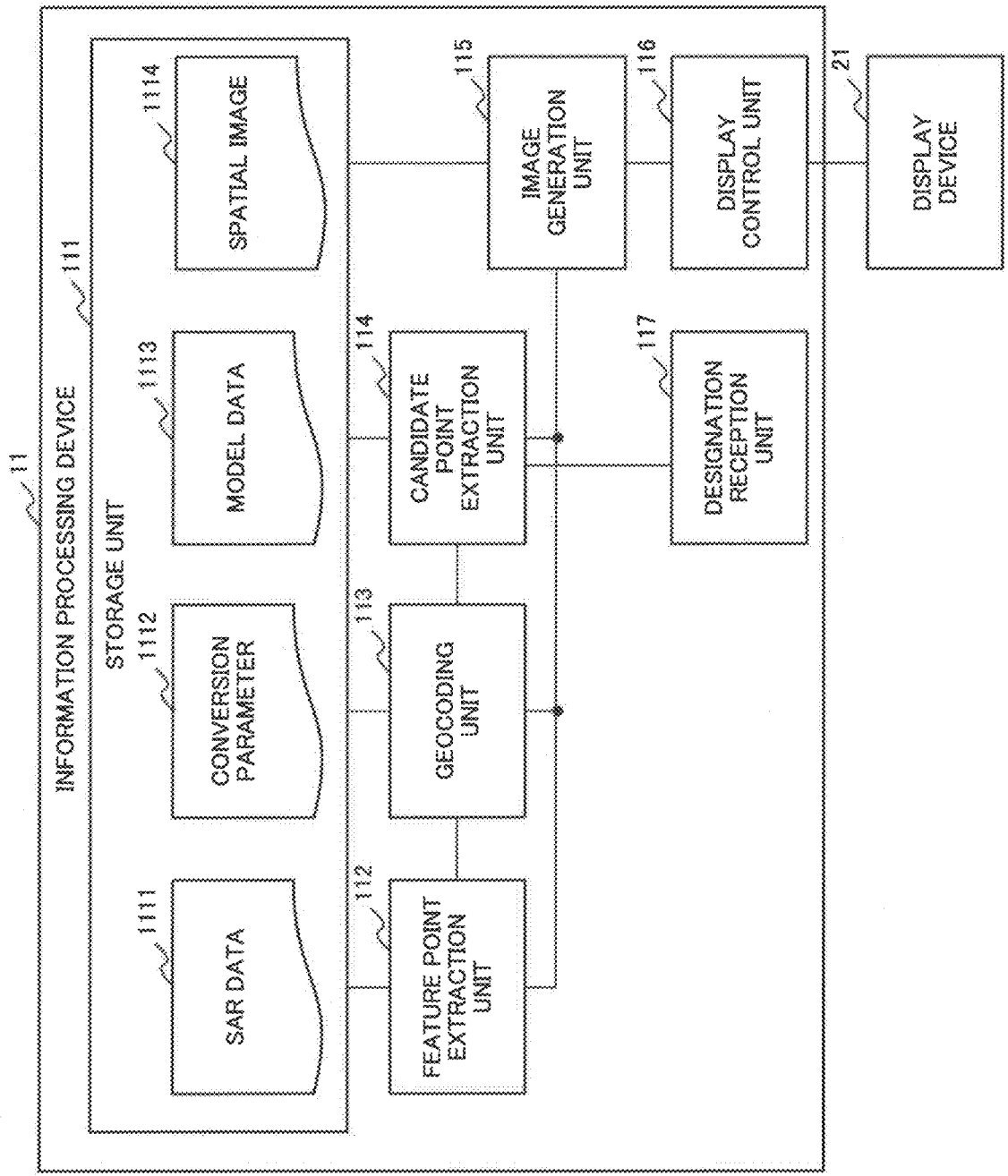
FIG. 3 is a block diagram illustrating a configuration of an information processing device according to a first example embodiment of the present invention.

FIG. 3 is a block diagram illustrating a configuration of the information processing device 11 according to the first example embodiment. The information processing device 11 includes a storage unit 111, a feature point extraction unit 112, a geocoding unit 113, a candidate point extraction unit 114, an image generation unit 115, a display control unit 116, and a designation reception unit 117. The information processing device 11 is communicably connected to a display device 21.

Storage Unit 111

The storage unit 111 stores data required for processing by the information processing device 11. For example, the storage unit 111 stores SAR data 1111, a conversion parameter 1112, model data 1113, and a spatial image 1114.

SAR data 1111 are data representing an observation result by SAR. Targets observed by SAR (hereinafter also referred to as "observed objects") include, for example, a ground surface and a building. SAR data 1111 are data from which at least a SAR image associated with the reference coordinate system can be generated. For example, SAR data 1111 include an intensity for each observed reflected wave, positional information and a traveling direction of a radar when the reflected wave is observed, a distance between a reflection point and the radar, and a depression angle of the radar with respect to the reflection point (an elevation angle of the radar viewed from the reflection point). The positional information of the radar may be information described under a so-called geodetic system, such as a longitude, a latitude, and an altitude. The positional information has only to be information by which coordinates in the reference coordinate system can be specified.

SAR data 1111 may be a SAR image itself. In that case, the SAR image is associated with the reference coordinate system.

While SAR data 1111 are used in the description of the present example embodiment, observation result data by, for example, real aperture radar (RAR) may be used in another example embodiment.

A conversion parameter 1112 includes a parameter for associating any signal included in SAR data 1111 with the reference coordinate system. When the reference coordinate system is a geodetic system, a conversion parameter 1112 is a parameter for expressing coordinates of a signal included in SAR data 1111 under the geodetic system. For example, when data of a signal included in SAR data 1111 are expressed by positional information of a radar in the geodetic system and a distance between the radar and a reflection point of the signal, a conversion parameter 1112 has only to be a parameter for determining positional information of the reflection point in the geodetic system. When the reference coordinate system is not a geodetic system, a parameter for converting between coordinates in a geodetic system and coordinates in the reference coordinate system may be included. That a first coordinate system is convertible into a second coordinate system is hereinafter described as that the first coordinate system is "associated with" the second coordinate system.

A conversion parameter 1112 may include a parameter for associating a coordinate system of model data 1113 (to be described later) with the reference coordinate system.

Model data 1113 are data for three-dimensionally expressing a shape of objects such as a terrain and a structure of a building. Model data 1113 is, for example, a digital elevation model (DEM). Model data 1113 may be a digital surface model (DSM) that is data of a surface of the earth including a structure or a digital terrain model (DTM) which is data of a shape of a ground surface. Model data 1113 may separately include a DTM and three-dimensional data of a structure.

Model data 1113 is associated with the reference coordinate system. In other words, a point in model data 1113 may be described by coordinates in the reference coordinate system.

A spatial image 1114 is an image capturing a space including an observed object of SAR. For example, a spatial image 1114 may be any of an optical image such as a satellite photograph or an aerial photograph, a map, a topographical map, and a computer graphics (CG) expressing a terrain. A spatial image 1114 may be a projection view of model data 1113. It is preferable that a spatial image 1114 be an image allowing intuitive understanding of a geographical shape or an arrangement of objects in a space presented in the image.

An object or a terrain expressed in a spatial image 1114 is associated with the reference coordinate system. Specifically, when any point (at least a feature point and a candidate point, to be described later) in the reference three-dimensional space is included in a spatial image 1114, a position of the point in the spatial image 1114 is uniquely specified. When a spatial image 1114 is an aerial image captured from the sky, for example, a relation between a range of the aerial image and a range of the reference three-dimensional space may be already specified.

A spatial image 1114 may be taken in from outside the information processing device 11 or may be generated by, for example, the image generation unit 115, to be described later, projecting model data 1113.

The storage unit 111 does not always need to hold data inside the information processing device 11. For example, the storage unit 111 may record data into a device or a recording medium outside the information processing device 11 and acquire the data as needed. In other words, the storage unit 111 has only to be configured to acquire data requested by units in processing in the units, to be described later, in the information processing device 11.

Feature Point Extraction Unit 112

The feature point extraction unit 112 extracts a feature point from SAR data 1111. A feature point according to the present disclosure refers to a point extracted as a point which may be focused on in analysis on SAR data 1111. Specifically, the feature point extraction unit 112 extracts one or more points from SAR data 1111 by a predetermined method of point extraction. A point to be extracted from SAR data 1111 according to the present disclosure is a spot corresponding to a point in a SAR image. In other words, a point refers to a point considered to be a spot from which an acquired signal is transmitted. However, a point may be an aggregate of a plurality of adjacent points (data within a predetermined range).

For example, the feature point extraction unit 112 may extract a feature point by a technique called permanent scatterers interferometric SAR (PS-InSAR) disclosed in below-described Document 1 and the like.

Document 1: Alessandro Ferretti, et al., "Permanent scatterers in SAR interferometry," IEEE Transactions on Geoscience and Remote Sensing, vol. 39, no. 1, 2001, pp. 8 to 20, retrieved from the Internet <URL: http://sismologia.ist.utl.pt/files/Ferretti_2001.pdf> (retrieved on Sep. 20, 2016)

PS-InSAR is a technique of extracting a point where a change in a signal intensity is observed from a plurality of SAR images on the basis of phase deviations.

Alternatively, the feature point extraction unit 112 may extract a point satisfying a predetermined condition (for example, a signal intensity exceeding a predetermined threshold value) input by a person or the like as a feature point. The feature point extraction unit 112 may extract a point selected by a determination by a person as a feature point.

The feature point extraction unit 112 transmits information about an extracted feature point to the geocoding unit 113. Information about a feature point includes at least information by which coordinates in the reference coordinate system can be specified. As an example, information about a feature point is expressed by positional information (such as a longitude, a latitude, and an altitude) of a radar when a SAR image including the feature point is captured, a traveling direction of the flying object equipped with the radar, a depression angle, and a position of the feature point in the SAR image or a distance between the radar and the feature point.

Geocoding Unit 113

The geocoding unit 113 assigns coordinates in the reference coordinate system to each feature point extracted by the feature point extraction unit 112. For example, the geocoding unit 113 receives information about an extracted feature point from the feature point extraction unit 112. On the basis of the information and a conversion parameter 1112, the geocoding unit 113 specifies a position to which a position of the feature point corresponds in the reference three-dimensional space.

For example, when the reference coordinate system is a geodetic system employing an earth ellipsoid, the geocoding unit 113 projects an extracted feature point on a surface (a position at an altitude 0) of the earth ellipsoid. A position of a point where the feature point shall be projected is a position where a distance from the radar is equal to a distance given by the information about the feature point. The geocoding unit 113 specifies coordinates of the projected point. The geocoding unit 113 thus assigns coordinates to the feature point, for example.

Candidate Point Extraction Unit 114

The candidate point extraction unit 114 associates a feature point assigned with coordinates in the reference coordinate system with a point (hereinafter referred to as a "candidate point(s)") relating to the feature point. A candidate point(s) relating to a feature point will be described below.

An intensity at a feature point (denoted as a point P) in a region where a layover occurs may be a sum of intensities of reflected waves at a plurality of points. At this time, a point that may contribute to the intensity at the point P is referred to as a candidate point relating to the point P in the present example embodiment.

Figure 4:
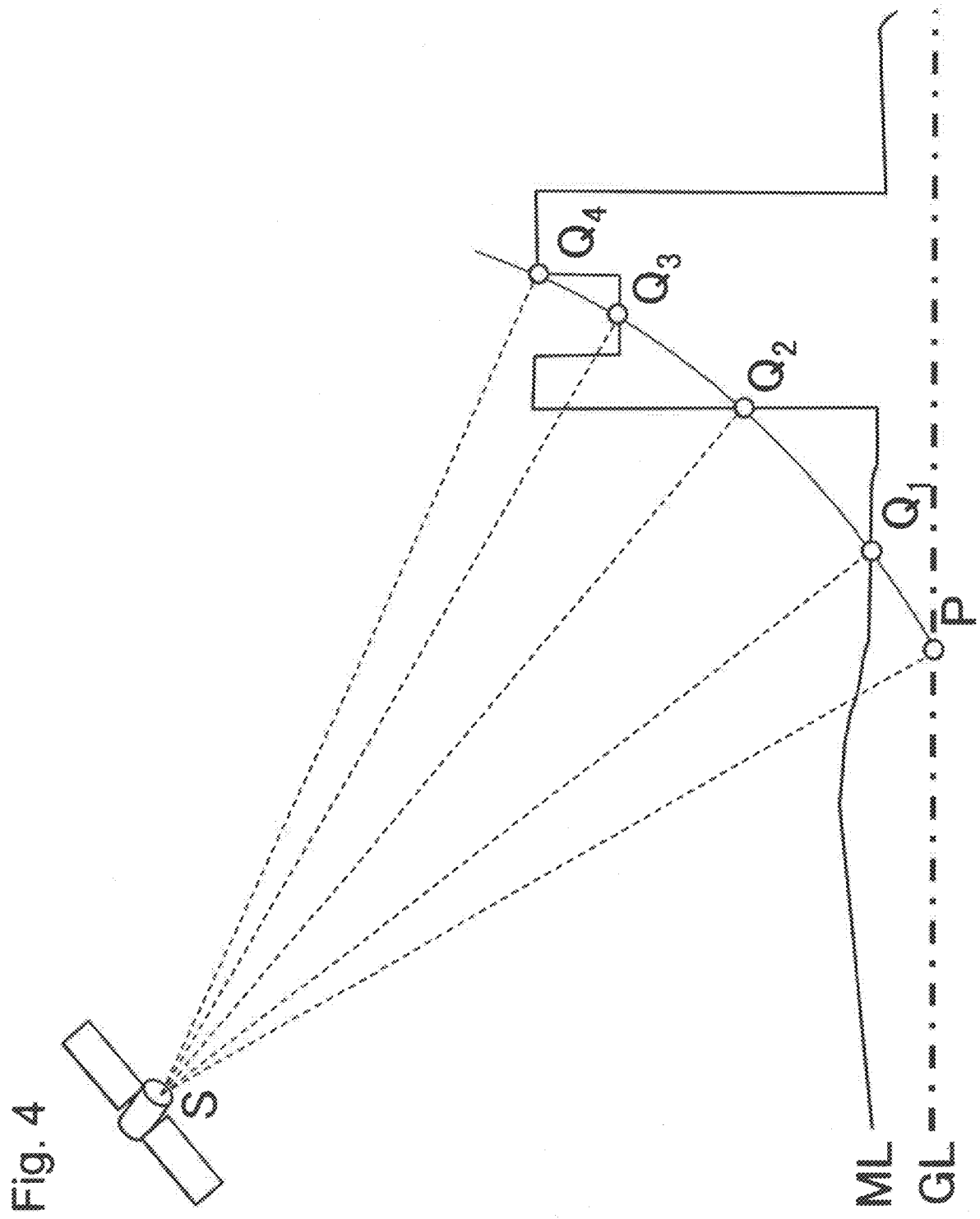
FIG. 4 is a diagram illustrating an example of a method of calculating a candidate point.

FIG. 4 is a diagram illustrating an example of a method of calculating a candidate point(s) by the candidate point extraction unit 114. FIG. 4 is a cross-sectional view cut out from the reference three-dimensional space by a plane passing through a point P and being perpendicular to a traveling direction (azimuth direction) of a radar.

A line GL is a cross-sectional line of a reference plane in the reference three-dimensional space, that is, a plane on which a feature point is projected. A line ML is a cross-sectional line of a three-dimensional structure expressed by model data 1113. A point S is a point indicating a position of the radar. The point P is a point on the line GL such that a distance between the point P and the point S is R. In other words, a position of the point P is a position of coordinates given to the feature point by the geocoding unit 113. When a SAR image is expressed under the reference coordinate system, a signal of the feature point is indicated at a position of the point P in the SAR image.

A reflected signal at a point which is on the cross-sectional view and whose distance to the point S is R is reflected in the intensity at the point P. In other words, a point relating to the point P is a point at which a circular arc with radius R centered at the point S intersects with the line ML. When determining points at which the circular arc with radius R centered at the point S intersects with the line ML excluding the point P is performed as to FIG. 4, points $Q_1$, $Q_2$, $Q_3$, and $Q_4$ are acquired. In other words, the points $Q_1$, $Q_2$, $Q_3$, and $Q_4$ are considered candidate points.

However, since the point $Q_3$ is shadowed against the point S (is in a so-called radar shadow), it is not likely that an electromagnetic wave reflected at this point relates to the signal intensity at the point P. Accordingly, the candidate points may be the points $Q_1$, $Q_2$, and $Q_4$ excluding the point $Q_3$. In other words, the candidate point extraction unit 114 may exclude the point $Q_3$ from the candidate points since a segment connecting the point $Q_3$ and the point S intersects with the line ML at a point other than the point $Q_3$.

For example, as described above, the candidate point extraction unit 114 extracts candidate points relating to the feature point P. At this time, the candidate point extraction unit 114 may exclude, out of once extracted candidate points, a point considered not to relate to the point P from the candidate points.

Information required for candidate point extraction described above includes a cross-sectional line of model data 1113 by a plane passing through the point P and being perpendicular to the azimuth direction in the reference three-dimensional space, positions of the point S and the point P, and a distance R between the point S and the point P.

Figure 5:
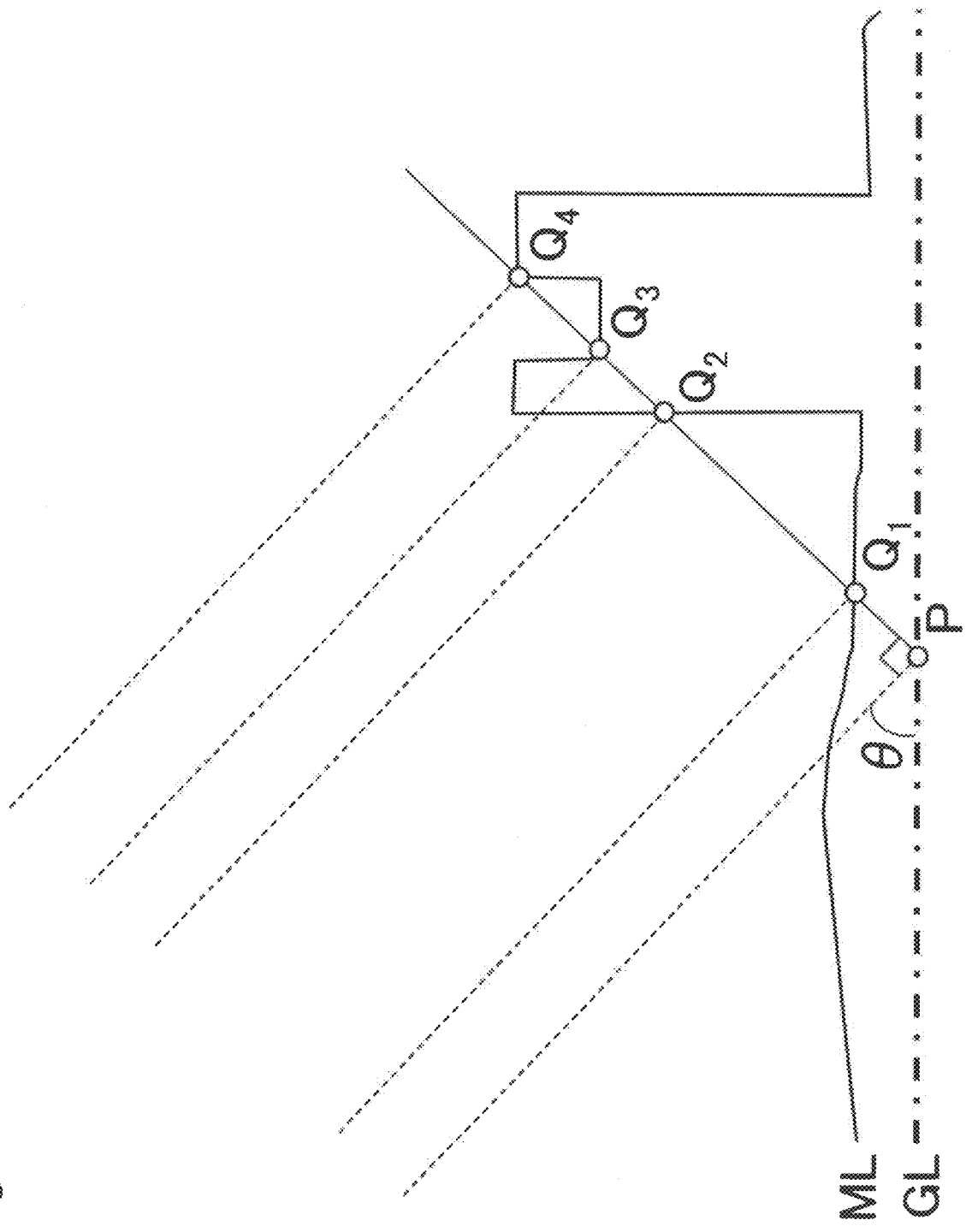
FIG. 5 is a diagram illustrating another example of a method of calculating a candidate point.

When the point S is sufficiently distant, electromagnetic waves from the point S may be approximated to enter in parallel with an incident line of an electromagnetic wave into the point P. A method of determining candidate points when such an approximation is performed is illustrated in FIG. 5. In this case, candidate points can be specified by determining an intersection of a line perpendicular to an incident line of the radar into the point P and the line ML, on the basis of the point P. However, since a line parallel to an incident line of the radar passing through a point $Q_3$ intersects with the line ML (that is, the point is in a radar shadow) in FIG. 5, the point may be excluded from the candidate points. In extraction by such a method, accurate information about the position of the point S and the distance R is not necessary. The candidate point extraction unit 114 may calculate a position of a candidate point by use of, for example, a depression angle θ in place of the position of the point S and the distance R.

The candidate point extraction unit 114 transmits a candidate point(s) relating to a feature point to the image generation unit 115.

When having received designation of a feature point from the designation reception unit 117, to be described later, the candidate point extraction unit 114 transmits a candidate point(s) relating to the designated feature point to the image generation unit 115. Designation of a feature point will be described in detail in a description of the designation reception unit 117.

Image Generation Unit 115

The image generation unit 115 generates data of an image which the display control unit 116 causes the display device 21 to display. For example, images generated by the image generation unit 115 include a SAR image indicating a feature point and a spatial image 1114 indicating a candidate point(s).

Generation of SAR Image Indicating Feature Point

For example, the image generation unit 115 acquires a SAR image from SAR data 1111 and acquires information about a feature point included in the SAR image from the candidate point extraction unit 114. Then, the image generation unit 115 superimposes a sign (for example, a figure such as a circle) indicating a position of the feature point on the acquired SAR image. Consequently, a SAR image indicating the feature point is generated.

A SAR image acquired by the image generation unit 115 may be an image selected by a viewer or may be a SAR image generated from a range of data designated by a viewer. Alternatively, the image generation unit 115 may specify a range including every feature point extracted by the feature point extraction unit 112 and generate a SAR image from SAR data 1111 related to the range.

A SAR image may be corrected. Specifically, a SAR image may be an image indicating signal intensities of SAR data 1111 at positions determined taking into account of model data 1113.

Spatial Image Indicating Candidate Point

For example, the image generation unit 115 acquires coordinates of each candidate point relating to the aforementioned feature point from the candidate point extraction unit 114. Then, the image generation unit 115 reads a spatial image 1114 including the extracted candidate points from the storage unit 111. For example, the image generation unit 115 may specify a range in the reference three-dimensional space including the extracted candidate points and select a spatial image 1114 to be read on the basis of the specified range.

When a spatial image 1114 is an aerial view such as a map or an aerial photograph, the image generation means may cut out a range including every extracted candidate point from the spatial image 1114 and acquire the cut-out aerial view as a spatial image to be used.

Then, the image generation unit 115 superimposes a display indicating positions of the extracted candidate points on the read spatial image 1114. Consequently, a spatial image 1114 indicating the candidate points is generated.

When superimposing a display indicating the positions of the candidate points on the read spatial image 1114, the image generation unit 115 may specify the positions of the candidate points by calculation based on a conversion parameter 1112 or the like.

A specific example of specifying a position of a candidate point by the image generation unit 115 is described.

For example, the image generation unit 115 reads an optical satellite image as a spatial image on which a display indicating candidate points is superimposed. An optical satellite image refers to an image of a ground surface captured from an elevated spot by an imaging device such as a camera equipped on an aircraft or an artificial satellite.

An optical satellite image may be orthorectified. Orthorectification includes a type referred to as true orthorectification and a type referred to as ground orthorectification.

A true orthorectified image is an image in which not only a terrain but also a structure is orthorectified. When a spatial image is a true orthorectified image, a position of a candidate point is a position where coordinates of the candidate point in the reference coordinate system is orthogonally projected on a reference plane.

A ground orthorectified image is an image in which a terrain is orthorectified and a structure is not orthorectified. When an optical image is a ground orthorectified image, the image generation unit 115 determines a position of a candidate point by performing perspective projection with regard to a candidate point positioned on a building surface. However, when the optical satellite image is the one captured from a sufficiently high altitude, the image generation unit 115 may perform parallel projection in place of perspective projection.

Even when a spatial image is different from the images described above, the image generation unit 115 may calculate a position of a candidate point on the basis of association of the spatial image with the reference coordinate system.

When receiving a candidate point relating to a designated feature point from the candidate point extraction unit 114, the image generation unit 115 generates a spatial image displaying the candidate point(s) relating to the designated feature point with an appearance different from that of other candidate points. For example, a different appearance refers to a difference in color, brightness, size, motion, change of these factors over time, or the like. As an example, the image generation unit 115 may display the candidate point(s) relating to the designated feature point in red and the other candidate points in white. The image generation unit 115 may not display the other candidate points and display only the candidate point(s) relating to the designated feature point.

The image generation unit 115 transmits the generated image to the display control unit 116. An image generated by the image generation unit 115 and an image transmitted by the image generation unit 115 may not be data in an image format. The generated image and the transmitted image have only to be data including information required for display by the display device.

Display Control Unit 116 and Display Device 21

The display control unit 116 causes the display device 21 to display an image received from the image generation unit 115. For example, the display device 21 is a display such as a liquid crystal monitor or a projector. The display device 21 may have a function as an input unit as is the case with a touch panel. While the display device 21 is connected to the information processing device 11 as a device external to the information processing device 11 in the description of the present example embodiment, there may be a mode of the display device 21 being included inside the information processing device 11 as a display unit. In that case, for example, the display unit may be integrated with the designation reception unit 117 and provide an input-output function.

Through a display of the display device 21, a viewer viewing the display gets to know a result of processing by the information processing device 11. Specifically, the viewer can observe a SAR image indicating a feature point. Further, a person can view a spatial image displaying candidate points.

Designation Reception Unit 117

The designation reception unit 117 receives designation of a feature point. For example, the designation reception unit 117 recognizes a feature point selected through an input-output device such as a mouse by a person observing a SAR image in which feature points are shown. When the display device 21 has an input function, the designation reception unit 117 may receive an input given to the display device 21 and recognize a selection of a feature point on the basis of the input. The designation reception unit 117 receives the recognized feature point as a designated feature point. The designation reception unit 117 may receive designation of a plurality of feature points.

The designation reception units 117 convey received designation of a feature point to the candidate point extraction unit 114. Specifically, for example, the designation reception unit 117 transmits information for identifying a designated feature point to the candidate point extraction unit 114. Information for identifying a feature point is, for example, a numeral or coordinates, associated with the feature point.

The candidate point extraction unit 114 transmits, on the basis of designation of a feature point received from the designation reception unit 117, a candidate point(s) relating to the designated feature point to the image generation unit 115. Subsequently, the image generation unit 115 generates a spatial image showing a candidate point(s) relating to the designated feature point with an appearance different from that of other candidate points. By the display device 21 displaying the spatial image, a person viewing the display can grasp the candidate point(s) relating to the designated feature point.

Operation

Figure 6:
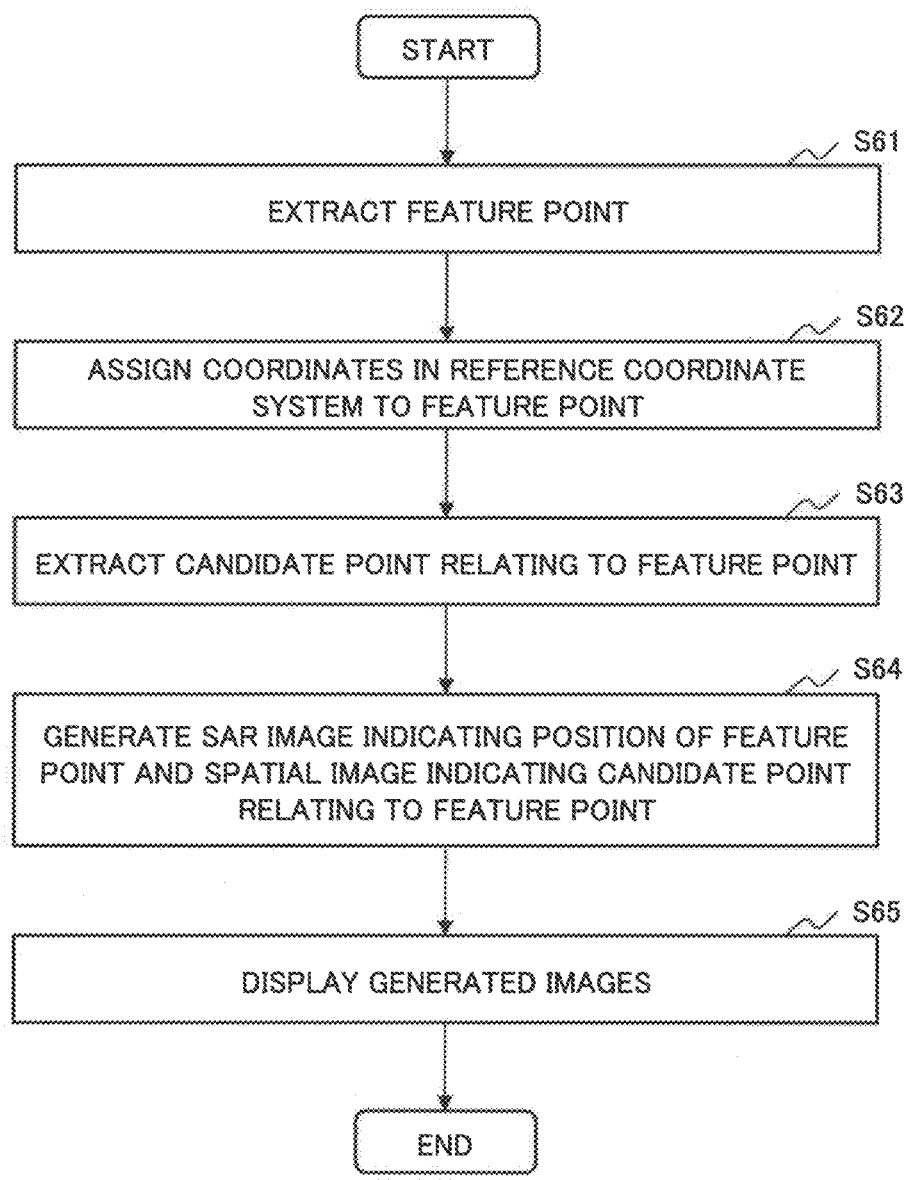
FIG. 6 is a flowchart illustrating a processing flow in the information processing device according to the first example embodiment.

An example of a flow of processing by the information processing device 11 will be described along a flowchart in FIG. 6.

For example, first, in order to view a SAR image of a specific area based on SAR data 1111 stored by the storage unit 111, a user selects the SAR image included in the storage unit 111.

On the basis of the SAR data 1111 and the like, the feature point extraction unit 112 extracts a feature point(s) from the selected SAR image (Step S61). The feature point extraction unit 112 transmits information about the extracted feature point(s) to the geocoding unit 113.

The geocoding unit 113 assigns coordinates in the reference coordinate system to the extracted feature point(s) (Step S62). For example, when the SAR image is associated with the reference coordinate system, the geocoding unit 113 may specify coordinates in the reference coordinate system on the basis of a position in the SAR image. The geocoding unit 113 transmits the coordinates of the extracted feature point(s) to the candidate point extraction unit 114.

The candidate point extraction unit 114 extracts candidate points relating to the feature point(s) on the basis of the coordinates of the feature point(s), model data 1113, and so on (Step S63). In other words, the candidate point extraction unit 114 determines coordinates of candidate points (in the reference coordinate system) by the method already described. The candidate point extraction unit 114 transmits the coordinates of the candidate points to the image generation unit 115.

The image generation unit 115 generates a SAR image in which the position(s) of the feature point(s) is shown and a spatial image in which the candidate points relating to the feature point(s) are shown (Step S64).

Figure 7:
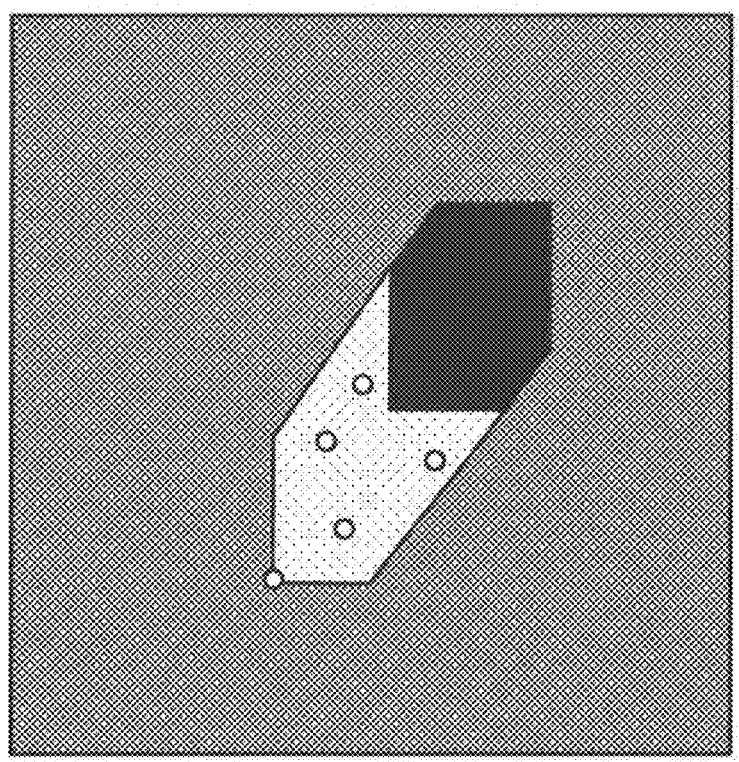
FIG. 7 illustrates an example of a SAR image indicating positions of feature points.

A SAR image in which positions of feature points are shown is, for example, an image acquired by superimposing signs indicating the positions of the feature points on a selected SAR image. FIG. 7 illustrates an example of a SAR image in which positions of feature points are shown. In the example in FIG. 7, circles representing feature points are superimposed on a SAR image in which an intensity is expressed by a brightness level.

Figure 8:
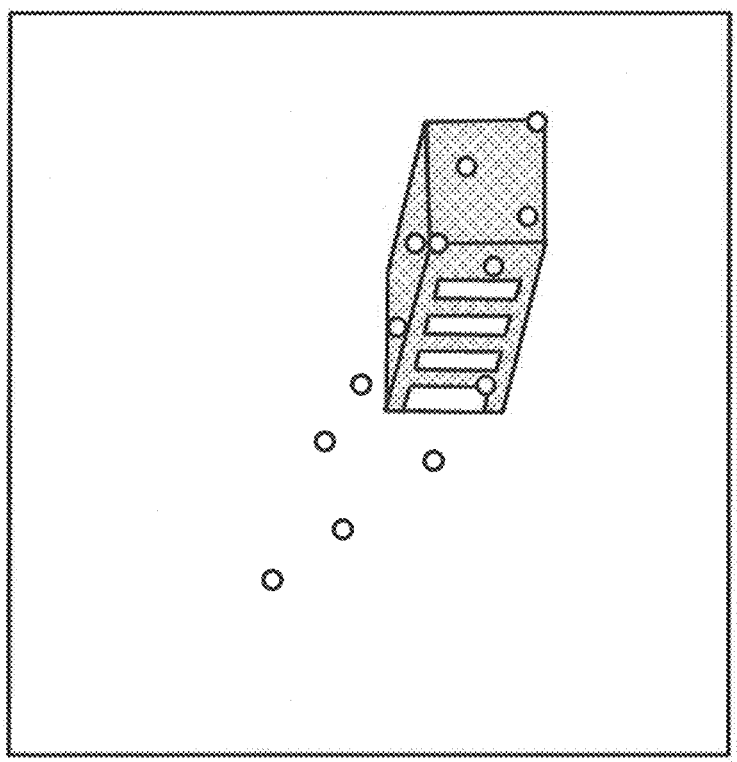
FIG. 8 illustrates an example of a spatial image indicating candidate points relating to feature points.

A spatial image in which candidate points relating to a feature point(s) are shown is, for example, an image acquired by superimposing signs indicating positions of the candidate points on a spatial image 1114 read from the storage unit 111. FIG. 8 illustrates an example of a spatial image indicating candidate points relating to feature points. In the example in FIG. 8, circles representing candidate points are superimposed on an optical satellite image capturing a building. The spatial image may be selected by a viewer. In particular, when a spatial image 1114 is an optical satellite image, the image generation unit 115 may cut out a relevant range to be used from the spatial image 1114 on the basis of a range of the selected SAR image.

The image generation unit 115 transmits the generated images to the display control unit 116.

The display control unit 116 causes the display device 21 to display the images generated by the image generation unit 115. Consequently, the display device 21 displays the images generated by the image generation unit 115 (Step S65). For example, the display control unit 116 causes the display device 21 to display the image in FIG. 7 and the image in FIG. 8 side by side. By viewing this display, a viewer can grasp the candidate points associated with the feature points in the SAR image.

In the example in FIG. 8, candidate points relating to each of a plurality of feature points are displayed at the same time. A viewer may send designation of a feature point to the designation reception unit 117 in order to distinguish only candidate points relating to a single feature point.

Figure 9:
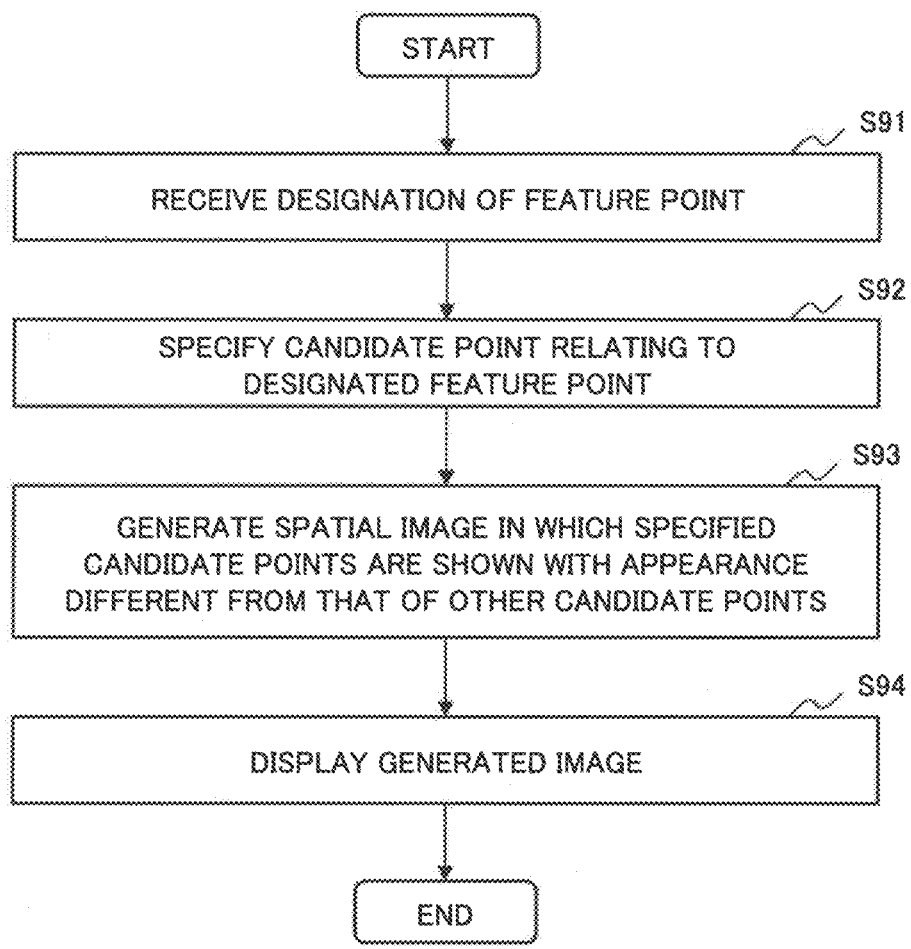
FIG. 9 is a flowchart illustrating a processing flow in the information processing device according to the first example embodiment when designation of a feature point is received.

FIG. 9 is a flowchart illustrating a processing flow in the information processing device 11 when the designation reception unit 117 receives designation of a feature point.

For example, a viewer selects one of feature points while viewing a display such as FIG. 7. A selection method may be a method including positioning a cursor at a feature point and clicking a mouse or may be, when a number is assigned to a feature point, a method including inputting the number. The designation reception unit 117 receives, for example, such a feature point selection as designation of a feature point (Step S91) and transmits information about the selected feature point to the candidate point extraction unit 114.

On the basis of the information about the feature point received from the designation reception unit 117, the candidate point extraction unit 114 specifies candidate points relating to the feature point (Step S92). The candidate point extraction unit 114 may store coordinates of candidate points (determined in Step S63) relating to feature points along with a relation to the feature point. When storing the coordinates and the relation, the candidate point extraction unit 114 has only to read coordinates of candidate points relating to the feature point. When not storing the coordinates and the relation, the candidate point extraction unit 114 may extract candidate points relating to the designated feature point again, similarly to the processing in Step S63.

The image generation unit 115 may store a relation between a feature point and displayed candidate points. In that case, the candidate point extraction unit 114 has only to transmit information about the designated feature point to the image generation unit 115 (or the designation reception unit 117 may transmit the information about the designated feature point directly to the image generation unit 115), and the image generation unit 115 performs the processing in Step S92.

Figure 10:
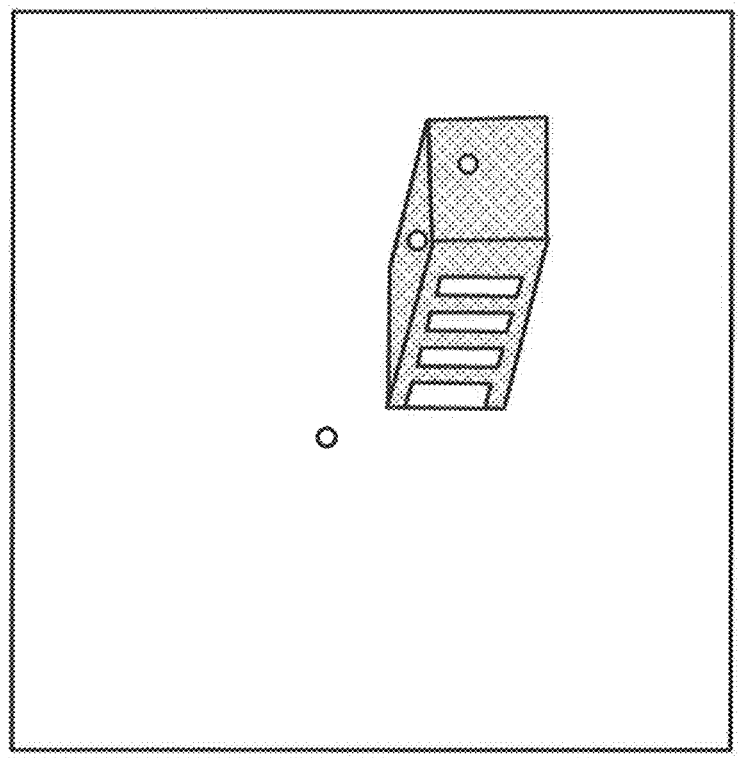
FIG. 10 illustrates an example of a spatial image displaying specific candidate points with an appearance different from that of other candidate points.

The image generation unit 115 generates a spatial image in which the specified candidate points are shown with an appearance different from that of other candidate points (Step S93). FIG. 10 illustrates an example of an image generated in this step. In the example in FIG. 10, signs of candidate points other than the designated candidate points among many candidate points are eliminated, and only signs of the designated candidate points are superimposed on a spatial image. The image generation unit 115 transmits the generated image to the display control unit 116.

The display control unit 116 causes the display device 21 to display the image generated by the image generation unit 115. The display device 21 displays the image (Step S94). For example, the display control unit 116 causes the display device 21 to display the image in FIG. 10 in place of the image in FIG. 8. Consequently, a viewer can readily recognize candidate points on the spatial image relating to the designated feature point.

Effect

The information processing device 11 according to the first example embodiment enables a viewer to readily understand a point contributing to a signal at a point in a region where a layover occurs in a SAR image. The reason is that the candidate point extraction unit 114 extracts a candidate point that is a point possibly contributing to the signal at a feature point on the basis of model data 1113, and the image generation unit 115 generates an image displaying a position of the candidate point in a spatial image.

By using model data 1113, the candidate point extraction unit 114 is capable of calculating candidate points relating to a feature point. Further, excluding a point included in a radar shadow region from candidates in a process of extracting candidate points encourages a viewer to more accurately understand candidate points.

Furthermore, reception of designation of a feature point by the designation reception unit 117 and display of candidate points relating to the designated feature point with an appearance different from that of other candidate points enable a viewer to more readily understand the feature point.

Second Example Embodiment

The image generation unit 115 may generate a single image displaying a feature point and a candidate point at the same time. A mode in which a type of an image generated by the image generation unit 115 is different from that in the first example embodiment is described below as a second example embodiment of the present invention.

The image generation unit 115 superimposes information of SAR data 1111 on a spatial image 1114. Specifically, for example, the image generation unit 115 reflects, in a spatial image, signal intensities at points corresponding to points in the spatial image. More specifically, the image generation unit 115 generates an image in which points on a spatial image corresponding to points in the SAR image is processed in a different color or the like depending on signal intensities at the points. Points on a spatial image corresponding to points in a SAR image refer to points considered to contribute to signals at points in the SAR data 1111 (for example, a point closest to a radar (such as the point $Q_1$) out of points on a surface of a model by model data 1113). For example, the image generation unit 115 generates an image displaying a point on a spatial image corresponding to a point with a lower signal intensity in the SAR image at a lower brightness level and a point on the spatial image corresponding to a point with a higher signal intensity in the SAR image at a higher brightness level. The image is hereinafter referred to as a superimposed image.

Figure 11:
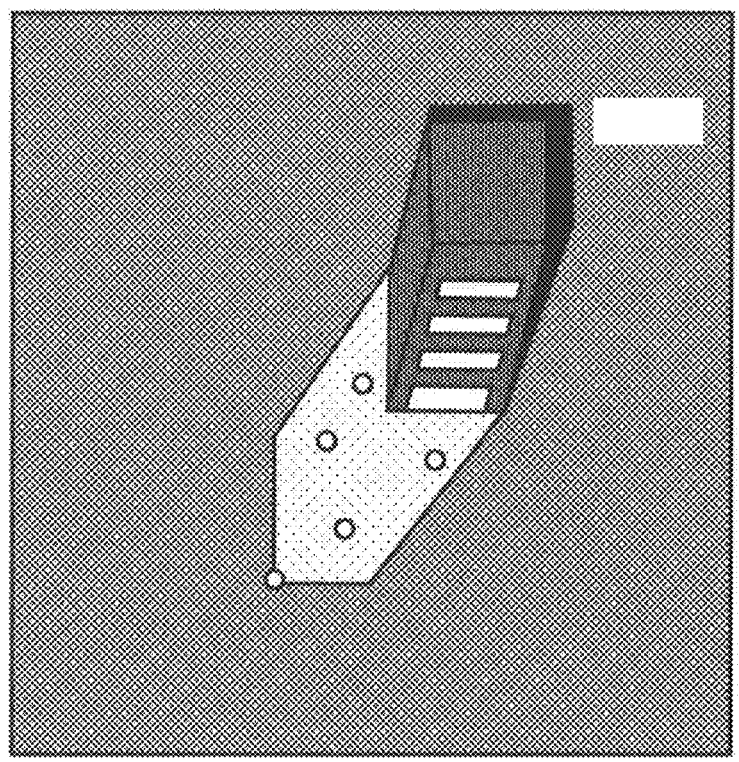
FIG. 11 illustrates an example of an image generated by an image generation unit according to a second example embodiment of the present invention.

The image generation unit 115 superimposes signs indicating positions of candidate points reflecting signal intensities at extracted feature points on the superimposed image, out of candidate points relating to the feature point. FIG. 11 illustrates an example of an image generated by the image generation unit 115 according to the present example embodiment. Thus, for each feature point, the image generation unit 115 generates a display image on which a sign indicting at least one position of a candidate point relating to the feature point is superimposed. In other words, displayed candidate points are representatives of candidate points relating to respective feature points. A displayed candidate point is hereinafter referred to as a representative point. A number of the representative point does not need to be one for each feature point (for example, the image generation unit 115 may display the point $Q_1$ and the point $Q_2$ as representative points relating to the point P).

The candidate point extraction unit 114 does not need to extract every candidate point of the feature point at this point in time. As long as the candidate point extraction unit 114 extracts at least a representative point, the image generation unit 115 can generate the aforementioned image.

The display control unit 116 causes the display device 21 to display the generated image.

A viewer selects one or more of displayed representative points. For example, the viewer positions a cursor on the displayed image by use of a mouse. For example, the designation reception unit 117 receives the mouse-overed representative point as a designated representative point. The viewer may select (designate) two or more representative points by clicking.

On the basis of information about a point received from the designation reception unit 117, the candidate point extraction unit 114 specifies candidate points relating to the representative point (Step S92). A candidate point relating to a representative point specifically refers to a candidate point contributing to a signal intensity exhibited at the representative point ($Q_1$, $Q_2$, and $Q_4$ in the example in FIG. 4). The candidate point extraction unit 114 transmits information about the specified candidate points to the image generation unit 115.

Figure 12:
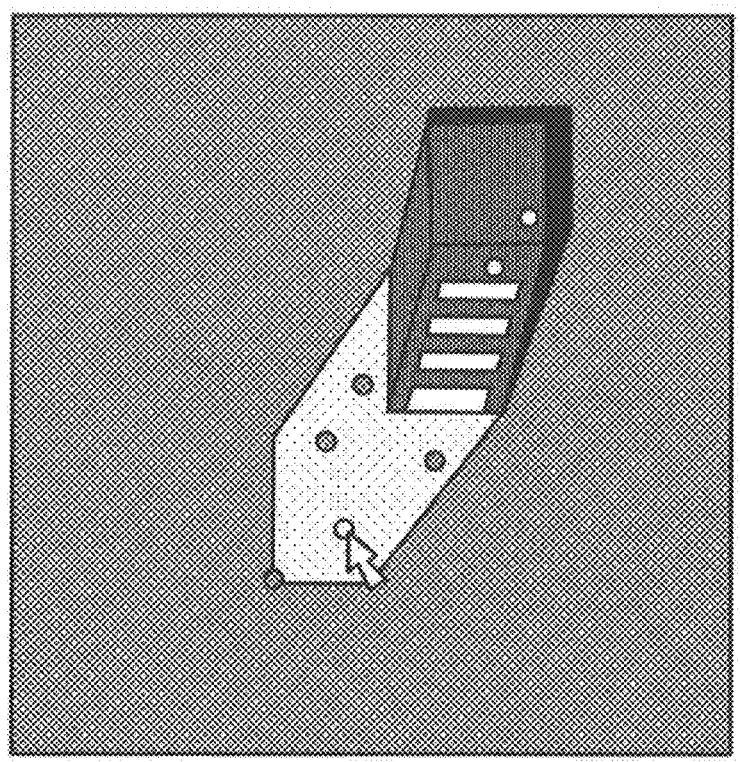
FIG. 12 illustrates an example of an image displayed by a display device according to the second example embodiment after designation of a feature point.

The image generation unit 115 generates a superimposed image displaying positions of the specified candidate points. The display control unit 116 causes the display device 21 to display the generated image. FIG. 12 illustrates an example of an image displayed by the display device 21. As illustrated in FIG. 12, candidate points relating to a representative point on which a cursor is positioned is displayed. Representative points other than the representative point on which the cursor is positioned may be changed to a quiet color as is the case with FIG. 10.

With the configuration as described above, a viewer can readily recognize one or more candidate points relating to a feature point on a spatial image and candidate points relating to a selected candidate point.

Main Configuration

Figure 13:
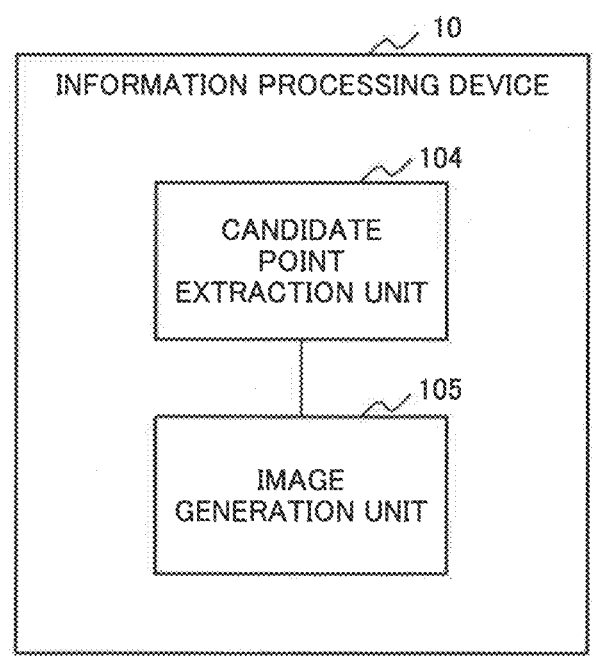
FIG. 13 is a block diagram illustrating a configuration of an information processing device including a main configuration of the example embodiments of the present invention.

A main configuration of the example embodiments of the present invention is described. FIG. 13 is a block diagram illustrating a configuration of an information processing device 10 including a main configuration of example embodiments of the present invention. The information processing device 10 includes a candidate point extraction unit 104 and an image generation unit 105.

An example of the candidate point extraction unit 104 is the candidate point extraction unit 114 according to aforementioned example embodiments. An example of the image generation unit 105 is the image generation unit 115 according to aforementioned example embodiments.

Figure 14:
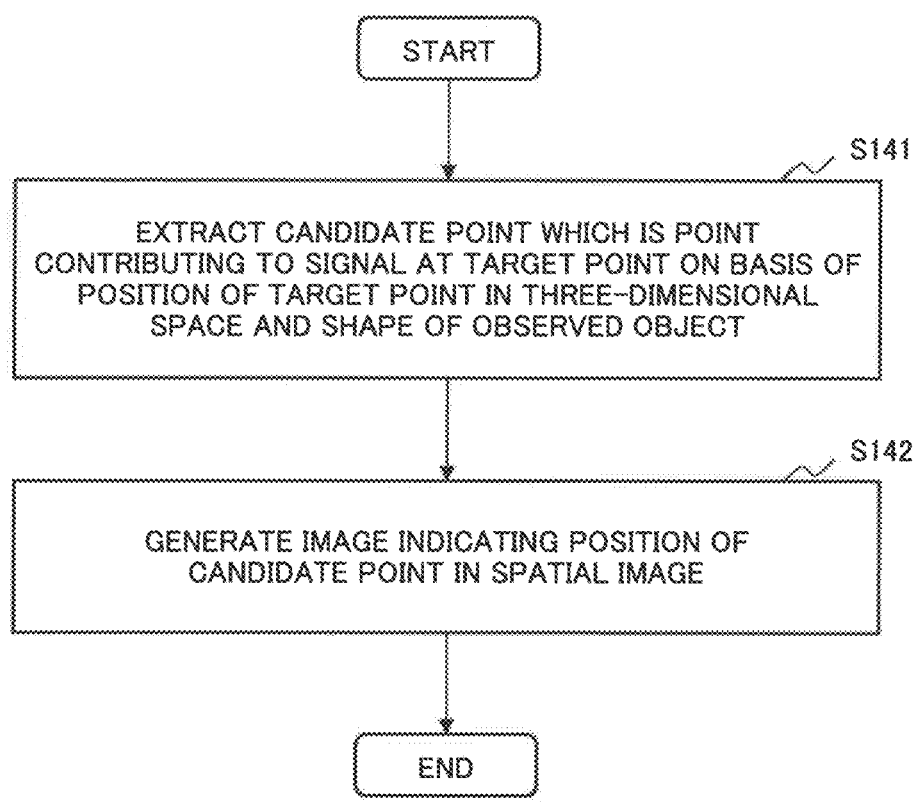
FIG. 14 is a flowchart illustrating a main operation in the example embodiments of the present invention.

Main processing in each unit in the information processing device 10 is described referring to a flowchart in FIG. 14.

The candidate point extraction unit 104 extracts a candidate point which is a point contributing to a signal at a target point, on the basis of a position of the target point in a three-dimensional space and a shape of an observed object (Step S141). The target point is a point specified in an intensity map of the signal from the observed object. The intensity map is acquired by a radar. An intensity map of a signal is, for example, a spatial image on which a SAR image or an observation result by SAR is superimposed. A point specified in an intensity map is associated with a point in the three-dimensional space. Examples of the target point include a feature point (a point illustrated in FIG. 7) according to the first example embodiment and a representative point (a point illustrated in FIG. 11) according to the second example embodiment. A shape of an observed object is given by model data of a three-dimensional model, for example. The candidate point extraction unit 104 has knowledge about positioning of the three-dimensional model in the three-dimensional space.

The image generation unit 105 generates an image indicating a position of the candidate point in a spatial image capturing the observed object (Step S142). Association of a point in the three-dimensional space with a point in the spatial image may be previously performed or may be performed by the image generation unit 105. In other words, the image generation unit 105 generates an image indicating a position of the candidate point in the spatial image on the basis of a position of the candidate point in the three-dimensional space and a relation between the spatial image and the three-dimensional space.

The configuration as described above facilitates understanding of a point on an observed object contributing to a signal at a point in an area where a layover occurs in an intensity map of a signal acquired by a radar from the observed object. The reason is that the candidate point extraction unit 104 extracts a candidate point contributing to a signal at a target point on the basis of model data, and the image generation unit 105 generates an image indicating a position of the candidate point in a spatial image capturing the observed object.

About Configuration Achieving Each Units

Figure 15:
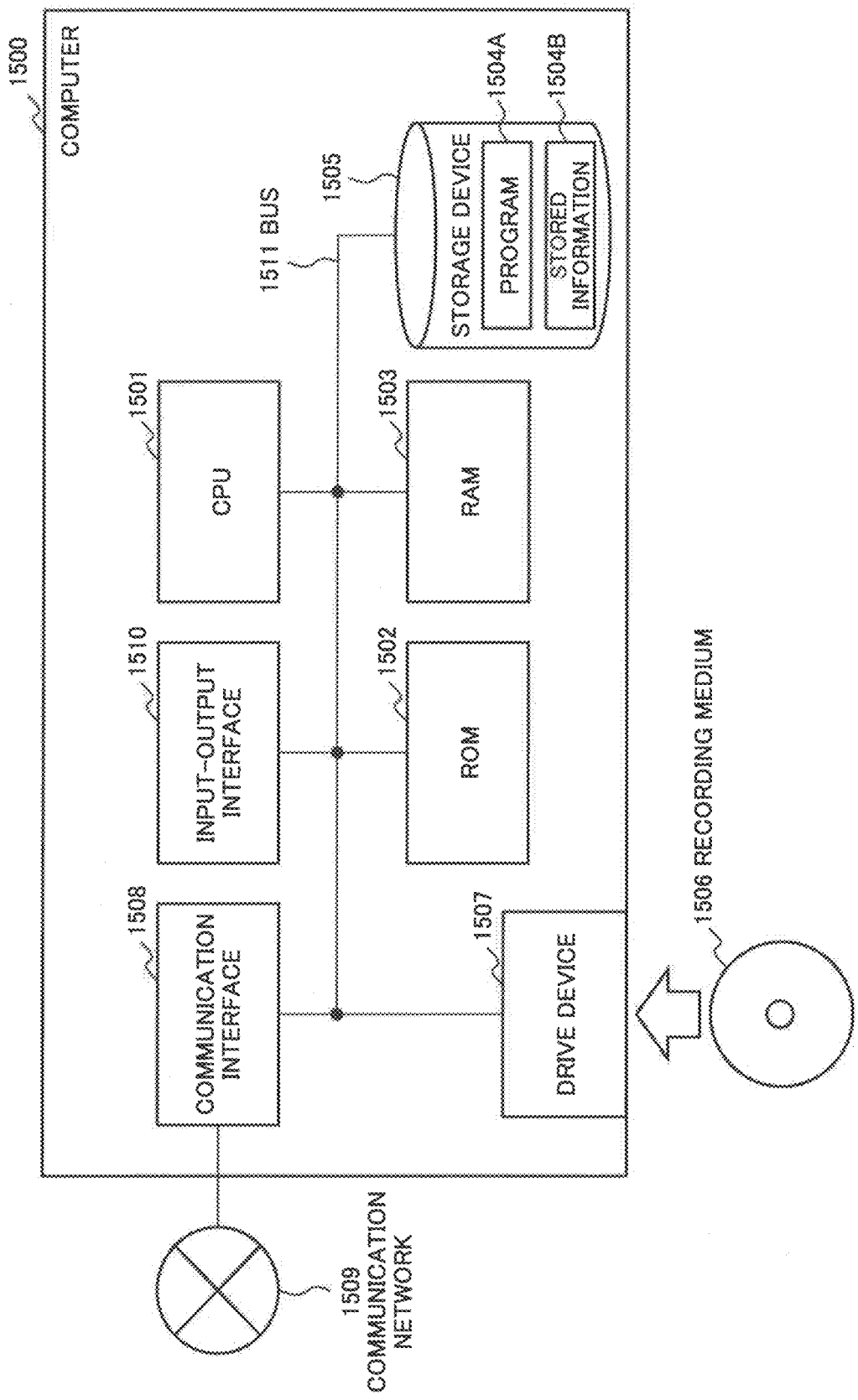
FIG. 15 is a block diagram illustrating an example of hardware that achieves each unit according to example embodiments of the present invention.

In the example embodiments of the present invention described above, each of components of the devices are denoted as a block on a function basis. A part or the entirety of the components of devices is achieved by a possible combination of, for example, a computer 1500 as illustrated in FIG. 15 and a program. The computer 1500 includes, as one example, configurations as follows.

- one or more central processing units (CPUs) 1501
- a read only memory (ROM) 1502
- a random access memory (RAM) 1503
- a program 1504A and stored information 1504B to be loaded on RAM 1503
- a storage device 1505 to store the program 1504A and stored information 1504B
- a drive device 1507 that reads from/writes on a recording medium 1506
- a communication interface 1508 connected with the communication network 1509
- an input-output interface 1510 that inputs/outputs data
- a bus 1511 that connects the components Each of the components of the devices in the example embodiments are achieved when the CPU 1501 runs the program 1504A achieving functions thereof after loading the program 1504A onto the RAM 1503. The program 1504A that achieves the function of the components of the devices is, for example, preliminarily stored on the storage device 1505 or ROM 1502, and the CPU 1501 reads the program when necessary. The program 1504A may be supplied to the CPU 1501 via the communication network 1509, or may be preliminarily stored on the storage medium 1506, and the drive device 1507 may read the program and provide the program to the CPU 1501.

The method for achieving each device has various modifications. Each of the components of the devices may be achieved by a possible combination of a separate computer 1500 and a program, for example. In addition, a plurality of components included in the devices may be achieved by a possible combination of one computer 1500 and a program.

A part or the entirety of the components of the devices is achieved by another general or dedicated circuit, a computer, or a combination thereof. These may be formed by a single chip, or may be formed by a plurality of chips that are connected via a bus.

When a part or the entirety of the components of the devices is achieved by a plurality of computers, circuits or the like, the plurality of computers, circuits or the like may be arranged in a concentrated manner or may be arranged in a distributed manner. For example, the computers, circuits or the like may be achieved in such a way that each of them is connected by a communication network, such as a client and server system, a cloud computing system or the like.

All or part of the example embodiments described above may be described as in the following supplementary notes, but the present invention is not limited thereto.

Supplementary Notes (Supplementary Note 1)

An information processing device comprising:

candidate point extraction means for extracting a candidate point which is a point contributing to a signal at a target point, based on a position of the target point in a three-dimensional space and a shape of an observed object, the target point being a point specified in an intensity map of the signal from the observed object, the intensity map being acquired by a radar; and image generation means for generating an image indicating a position of the candidate point in a spatial image capturing the observed object.

(Supplementary Note 2)

The information processing device according to Supplementary Note 1, further comprising designation reception means for receiving designation of the target point selected from target points associated with candidate points, positions of which are indicated by the image generated by the image generation means, wherein the image generation means generates the image indicating a position of the candidate point contributing to the signal at the target point indicated by the designation in the spatial image, with an appearance different from that of a position of other candidate points.

(Supplementary Note 3)

The information processing device according to Supplementary Note 1 or 2, wherein the radar is a synthetic aperture radar, and the information processing device further comprises feature point extraction means for extracting, as the target point, a feature point where a change in an intensity of the signal is observed by a plurality of intensity maps each of which is the intensity map.

(Supplementary Note 4)

The information processing device according to any one of Supplementary Notes 1 to 3, wherein the candidate point extraction means extracts, as the candidate point, a point on a surface of the observed object at a position not being hidden from the radar by the observed object, a distance between the position and the radar being equal to a distance between the target point and the radar.

(Supplementary Note 5)

The information processing device according to any one of Supplementary Notes 1 to 4, further comprising display control means for causing display means to display, side by side, a first image acquired by superimposing a sign indicating a position of the target point on the intensity map and a second image generated by the image generation means.

(Supplementary Note 6)

The information processing device according to Supplementary Note 5, wherein the image generation means acquires the spatial image by cutting out a range including the candidate point contributing to the signal at a feature point indicated by the first image from an image capturing the observed object, and generates an image, as the second image, by superimposing a sign indicating a position of the candidate point on the spatial image.

(Supplementary Note 7)

The information processing device according to Supplementary Note 1, wherein the image generation means generates a display image by superimposing, for each target point, signs indicating positions of one or more representative points out of the candidate points contributing to the signal at the target point, on a superimposed image acquired by superimposing information of an intensity of the signal on the spatial image, the information processing device further comprises designation reception means for receiving designation of a representative point selected from the one or more representative points displayed in the display image, and the image generation means generates an image by superimposing a sign indicating a position of the candidate point contributing to the signal at the representative point designated by the designation, on the superimposed image.

(Supplementary Note 8)

An information processing method comprising:

extracting a candidate point which is a point contributing to a signal at a target point, based on a position of the target point in a three-dimensional space and a shape of an observed object, the target point being a point specified in an intensity map of the signal from the observed object, the intensity map being acquired by a radar; and generating an image indicating a position of the candidate point in a spatial image capturing the observed object.

(Supplementary Note 9)

The information processing method according to Supplementary Note 8, further comprising:

receiving designation of the target point selected from target points associated with candidate points, positions of which are indicated in the spatial image; and generating the image indicating a position of the candidate point contributing to the signal at the target point indicated by the designation in the spatial image, with an appearance different from that of a position of other candidate points.

(Supplementary Note 10)

The information processing method according to Supplementary Note 8 or 9, wherein the radar is a synthetic aperture radar, and the information processing method further comprises extracting, as the target point, a feature point where a change in an intensity of the signal is observed by a plurality of intensity maps each of which is the intensity map.

(Supplementary Note 11)

The information processing method according to any one of Supplementary Notes 8 to 10, comprising extracting, as the candidate point, a point on a surface of the observed object at a position not being hidden from the radar by the observed object, a distance between the position and the radar being equal to a distance between the target point and the radar.

(Supplementary Note 12)

The information processing method according to any one of Supplementary Notes 8 to 11, further comprising causing display means to display, side by side, a first image acquired by superimposing a sign indicating a position of the target point on the intensity map and a second image indicating the position of the candidate point in the spatial image.

(Supplementary Note 13)

The information processing method according to Supplementary Note 12, comprising:

acquiring the spatial image by cutting out a range including the candidate point contributing to the signal at a feature point indicated by the first image from an image capturing the observed object; and generating an image, as the second image, by superimposing a sign indicating a position of the candidate point on the spatial image.

(Supplementary Note 14)

The information processing method according to Supplementary Note 8, comprising:

generating a display image by superimposing, for each target point, signs indicating positions of one or more representative points out of the candidate points contributing to the signal at the target point, on a superimposed image acquired by superimposing information of an intensity of the signal on the spatial image;

receiving designation of a representative point selected from the one or more representative points displayed in the display image; and generating an image by superimposing a sign indicating a position of the candidate point contributing to the signal at the representative point designated by the designation, on the superimposed image.

(Supplementary Note 15)

A program that causes a computer to perform:

candidate point extraction processing of extracting a candidate point which is a point contributing to a signal at a target point, based on a position of the target point in a three-dimensional space and a shape of an observed object, the target point being a point specified in an intensity map of the signal from the observed object, the intensity map being acquired by a radar; and image generation processing of generating an image indicating a position of the candidate point in a spatial image capturing the observed object.

(Supplementary Note 16)

The program according to Supplementary Note 15, further causing the computer to perform designation reception processing of receiving designation of the target point selected from target points associated with candidate points, positions of which are indicated by the image generated by the image generation processing, wherein the image generation processing generates the image indicating a position of the candidate point contributing to the signal at the target point indicated by the designation in the spatial image, with an appearance different from that of a position of other candidate points.

(Supplementary Note 17)

The program according to Supplementary Note 15 or 16, wherein the radar is a synthetic aperture radar, and the program further causes the computer to perform feature point extraction processing of extracting, as the target point, a feature point where a change in an intensity of the signal is observed by a plurality of intensity maps each of which is the intensity map.

(Supplementary Note 18)

The program according to any one of Supplementary Notes 15 to 17, wherein the candidate point extraction processing extracts, as the candidate point, a point on a surface of the observed object at a position not being hidden from the radar by the observed object, a distance between the position and the radar being equal to a distance between the target point and the radar.

(Supplementary Note 19)

The program according to any one of Supplementary Notes 15 to 18, further causing the computer to perform display control processing of causing display means to display, side by side, a first image acquired by superimposing a sign indicating a position of the target point on the intensity map and a second image generated by the image generation processing.

(Supplementary Note 20)

The program according to Supplementary Note 19, wherein the image generation processing acquires the spatial image by cutting out a range including the candidate point contributing to the signal at a feature point indicated by the first image from an image capturing the observed object, and generates an image, as the second image, by superimposing a sign indicating a position of the candidate point on the spatial image.

(Supplementary Note 21)

The program according to Supplementary Note 15, wherein the image generation processing generates a display image by superimposing, for each target point, signs indicating positions of one or more representative points out of the candidate points contributing to the signal at the target point, on a superimposed image acquired by superimposing information of an intensity of the signal on the spatial image, the program further causes the computer to perform designation reception processing of receiving designation of a representative point selected from the one or more representative points displayed in the display image, and the image generation processing generates an image by superimposing a sign indicating a position of the candidate point contributing to the signal at the representative point designated by the designation, on the superimposed image.

The present invention is not limited to the above-described example embodiments. Within the scope of the present invention, various changes in form and details that may be understood by a person skilled in the art may be made at embodying the present invention.

The present application claims the benefits of priority based on Japanese Patent Application No. 2016-183325, filed on Sep. 20, 2016, the entire disclosure of which is incorporated herein by reference.

REFERENCE SIGNS LIST 10, 11 information processing device
104 candidate point extraction unit
105 image generation unit
111 storage unit
112 feature point extraction unit
113 geocoding unit
114 candidate point extraction unit
115 image generation unit
116 display control unit
117 designation reception unit
1111 SAR data
1112 conversion parameter
1113 model data
1114 spatial image
21 display device
1500 computer
1501 CPU
1502 ROM
1503 RAM
1504a program
1504b stored information
1505 storage device
1506 recording medium
1507 drive device
1508 communication interface
1509 communication network
1510 input-output interface
1511 bus

What is claimed is:

1. An information processing device comprising:
at least one memory storing instructions; and
at least one processor coupled to the memory and configured to execute the instructions to:
extract a candidate point which is a point contributing to a signal at a target point, based on a position of the target point in a three-dimensional space and a shape of an observed object, the target point being a point specified in an intensity map of the signal from the observed object, the intensity map being acquired by a radar; and
generate an image indicating a position of the candidate point in a spatial image capturing the observed object.

2. The information processing device according to claim 1, wherein the at least one processor is configured to execute the instructions to:
receive designation of the target point selected from target points associated with candidate points, positions of which are indicated in the spatial image, wherein
generate the image indicating a position of the candidate point contributing to the signal at the target point indicated by the designation in the spatial image, with an appearance different from that of a position of other candidate points.

3. The information processing device according to claim 1, wherein
the radar is a synthetic aperture radar, and
the at least one processor is further configured to execute the instructions to
extract, as the target point, a feature point where a change in an intensity of the signal is observed by a plurality of intensity maps each of which is the intensity map.

4. The information processing device according to claim 1, wherein the at least one processor is further configured to execute the instructions to
extract, as the candidate point, a point on a surface of the observed object at a position not being hidden from the radar by the observed object, a distance between the position and the radar being equal to a distance between the target point and the radar.

5. The information processing device according to claim 1, wherein the at least one processor is further configured to execute the instructions to
cause a display device to display, side by side, a first image acquired by superimposing a sign indicating a position of the target point on the intensity map and a second image indicating the position of the candidate point in the spatial image.

6. The information processing device according to claim 5, wherein the at least one processor is configured to execute the instructions to
acquire the spatial image by cutting out a range including the candidate point contributing to the signal at a feature point indicated by the first image from an image capturing the observed object, and generates an image, as the second image, by superimposing a sign indicating a position of the candidate point on the spatial image.

7. The information processing device according to claim 1, wherein the at least one processor is configured to execute the instructions to:
  generate display image by superimposing, for each target point, signs indicating positions of one or more representative points out of the candidate points contributing to the signal at the target point, on a superimposed image acquired by superimposing information of an intensity of the signal on the spatial image;
  receive designation of a representative point selected from the one or more representative points displayed in the display image; and
  generate an image by superimposing a sign indicating a position of the candidate point contributing to the signal at the representative point designated by the designation, on the superimposed image.

8. An information processing method comprising:
  extracting a candidate point which is a point contributing to a signal at a target point, based on a position of the target point in a three-dimensional space and a shape of an observed object, the target point being a point specified in an intensity map of the signal from the observed object, the intensity map being acquired by a radar; and
  generating an image indicating a position of the candidate point in a spatial image capturing the observed object.

9. The information processing method according to claim 8, further comprising:
  receiving designation of the target point selected from target points associated with candidate points, positions of which are indicated in the spatial image; and
  generating the image indicating a position of the candidate point contributing to the signal at the target point indicated by the designation in the spatial image, with an appearance different from that of a position of other candidate points.

10. The information processing method according to claim 8, wherein
  the radar is a synthetic aperture radar, and
  the information processing method further comprises
  extracting, as the target point, a feature point where a change in an intensity of the signal is observed by a plurality of intensity maps each of which is the intensity map.

11. The information processing method according to claim 8, comprising
  extracting, as the candidate point, a point on a surface of the observed object at a position not being hidden from the radar by the observed object, a distance between the position and the radar being equal to a distance between the target point and the radar.

12. The information processing method according to claim 8, further comprising
  causing a display device to display, side by side, a first image acquired by superimposing a sign indicating a position of the target point on the intensity map and a second image indicating the position of the candidate point in the spatial image.

13. The information processing method according to claim 12, comprising:
  acquiring the spatial image by cutting out a range including the candidate point contributing to the signal at a feature point indicated by the first image from an image capturing the observed object; and
  generating an image, as the second image, by superimposing a sign indicating a position of the candidate point on the spatial image.

14. The information processing method according to claim 8, comprising:
  generating a display image by superimposing, for each target point, signs indicating positions of one or more representative points out of the candidate points contributing to the signal at the target point, on a superimposed image acquired by superimposing information of an intensity of the signal on the spatial image;
  receiving designation of a representative point selected from the one or more representative points displayed in the display image; and
  generating an image by superimposing a sign indicating a position of the candidate point contributing to the signal at the representative point designated by the designation, on the superimposed image.

15. A non-transitory computer-readable storage medium storing a program that causes a computer to perform:
  candidate point extraction processing of extracting a candidate point which is a point contributing to a signal at a target point, based on a position of the target point in a three-dimensional space and a shape of an observed object, the target point being a point specified in an intensity map of the signal from the observed object, the intensity map being acquired by a radar; and
  image generation processing of generating an image indicating a position of the candidate point in a spatial image capturing the observed object.

16. The storage medium according to claim 15, wherein
  the program further causes the computer to perform designation reception processing of receiving designation of the target point selected from target points associated with candidate points, positions of which are indicated by the image generated by the image generation processing, and
  the image generation processing generates the image indicating a position of the candidate point contributing to the signal at the target point indicated by the designation in the spatial image, with an appearance different from that of a position of other candidate points.

17. The storage medium according to claim 15, wherein
  the radar is a synthetic aperture radar, and
  the program further causes the computer to perform
  feature point extraction processing of extracting, as the target point, a feature point where a change in an intensity of the signal is observed by a plurality of intensity maps each of which is the intensity map.

18. The storage medium according to claim 15, wherein
  the candidate point extraction processing extracts, as the candidate point, a point on a surface of the observed object at a position not being hidden from the radar by the observed object, a distance between the position and the radar being equal to a distance between the target point and the radar.

19. The storage medium according to claim 15, wherein
  the program further causes the computer to perform display control processing of causing a display device to display, side by side, a first image acquired by superimposing a sign indicating a position of the target point on the intensity map and a second image generated by the image generation processing.

20. The storage medium according to claim 15, wherein
  the image generation processing generates a display image by superimposing, for each target point, signs indicating positions of one or more representative points out of the candidate points contributing to the signal at the target point, on a superimposed image acquired by superimposing information of an intensity of the signal on the spatial image, the program further causes the computer to perform designation reception processing of receiving designation of a representative point selected from the one or more representative points displayed in the display image, and the image generation processing generates an image by superimposing a sign indicating a position of the candidate point contributing to the signal at the representative point designated by the designation, on the superimposed image.

* * * * *